United States Patent
Yi et al.

(10) Patent No.: US 10,576,465 B2
(45) Date of Patent: Mar. 3, 2020

(54) CATALYST FOR PREPARING CHLORINE BY OXIDATION OF HYDROGEN CHLORIDE AND PREPARATION THEREOF

(71) Applicant: Wanhua Chemical Group Co., Ltd., Yantai (CN)

(72) Inventors: Guangquan Yi, Yantai (CN); Yinchuan Lou, Yantai (CN); Yi Wan, Yantai (CN); Xunkun Wu, Yantai (CN); Weiqi Hua, Yantai (CN); Jiansheng Ding, Yantai (CN)

(73) Assignee: Wanhua Chemical Group Co., Ltd., Yantai Shandong (CN)

( * ) Notice: Subject to any disclaimer, the term of this patent is extended or adjusted under 35 U.S.C. 154(b) by 60 days.

(21) Appl. No.: 15/621,282

(22) Filed: Jun. 13, 2017

(65) Prior Publication Data

US 2017/0274361 A1 Sep. 28, 2017

Related U.S. Application Data

(62) Division of application No. 13/880,184, filed as application No. PCT/CN2011/075319 on Jun. 3, 2011, now abandoned.

(30) Foreign Application Priority Data

Nov. 18, 2010 (CN) .......................... 2010 1 0567038

(51) Int. Cl.
| | |
|---|---|
| *C01B 7/04* | (2006.01) |
| *B01J 29/16* | (2006.01) |
| *B01J 23/83* | (2006.01) |
| *B01J 37/02* | (2006.01) |
| *B01J 29/14* | (2006.01) |

(52) U.S. Cl.
CPC ............ *B01J 29/146* (2013.01); *B01J 23/83* (2013.01); *B01J 29/16* (2013.01); *B01J 37/0244* (2013.01); *C01B 7/04* (2013.01); *Y02P 20/228* (2015.11)

(58) Field of Classification Search
CPC ... B01J 23/04; B01J 23/10; B01J 23/72; B01J 23/78; B01J 23/83; B01J 2523/10; B01J 2523/11; B01J 2523/12; B01J 2523/13; B01J 2523/14; B01J 2523/15; B01J 2523/17; B01J 2523/20; B01J 2523/30; B01J 2523/305; B01J 21/02; C01B 7/04
See application file for complete search history.

(56) References Cited

U.S. PATENT DOCUMENTS

| | | | |
|---|---|---|---|
| 4,123,389 A | 10/1978 | Pieters et al. | |
| 5,871,707 A * | 2/1999 | Hibi | .................. B01J 23/462 |
| | | | 423/502 |
| 8,222,178 B2 * | 7/2012 | Horiuchi | .................. B01J 23/83 |
| | | | 423/502 |
| 2002/0172640 A1 * | 11/2002 | Hibi | ........................ B01J 23/462 |
| | | | 423/502 |
| 2004/0186329 A1 * | 9/2004 | Hancu | .................... B01J 31/226 |
| | | | 570/254 |
| 2006/0140849 A1 * | 6/2006 | Kuhrs | ...................... B01J 23/52 |
| | | | 423/502 |
| 2011/0268649 A1 * | 11/2011 | Henze | .................... B01J 23/892 |
| | | | 423/502 |

FOREIGN PATENT DOCUMENTS

| | | | |
|---|---|---|---|
| CN | 1154340 A | 7/1997 | |
| CN | 1230461 A | 10/1999 | |
| CN | 1684903 A | 10/2005 | |
| CN | 101125297 A | 2/2008 | |
| CN | 101559374 A | 10/2009 | |
| CN | 101862663 A | 10/2010 | |
| CN | 102000583 A | 4/2011 | |
| EP | 0 936 184 A2 | 8/1999 | |
| JP | 2010-228952 | 10/2010 | |
| WO | WO 2007/125004 A1 | 11/2007 | |
| WO | WO-2010110392 A1 * | 9/2010 | ............ B01J 35/002 |

OTHER PUBLICATIONS

Machine translation of Schubert (WO2007/125004), pulication date Nov. 8, 2007.*
Jianping Chen et al., The Study of Reaction Mechanism for the Dehydrogenation of Ethylbenzene on Iron Oxide catalysts (I)—IR Spectra of Adspecies and Kinetic Isotope Effects, Chemical Journal of Chinese Universities, 1987, 3(1):21-29.
López, Núria et al., Mechanism of HCl Oxidation (Deacon Process) over $RUO_2$, Journal of Catalysis, 2008, 255:29-39, Elsevier.
Wanli Cheng et al., Journal of Fuzhou University (Natural Science), 1999, 27(1): 93-96.
Zhaou, Botao et al., "Oxidation Catalyst Researching Development of Chlorine from Hydrogen Chloride," Industrial Catalysis, vol. 15, supplement, 2007, pp. 78-81.

(Continued)

*Primary Examiner* — Jun Li

(74) *Attorney, Agent, or Firm* — Knobbe, Martens, Olson & Bear LLP

(57) ABSTRACT

The present invention relates to a catalyst for producing chlorine by oxidation of hydrogen chloride and a method for preparing the same. The catalyst comprises a support and active ingredients that comprise 1-20 wt % of copper, 0.01-5 wt % of boron, 0.1-10 wt % of alkali metal element(s), 0.1-15 wt % of one or more rare earth elements, and 0-10 wt % of one or more elements selected from magnesium, calcium, barium, manganese, iron, nickel, cobalt, zinc, ruthenium or titanium based on the total weight of the catalyst. The catalyst is prepared by a two-step impregnation method. Comparing with the available catalysts of the same type, the catalyst according to the present invention has greatly improved conversion and stability.

12 Claims, No Drawings

(56) References Cited

OTHER PUBLICATIONS

International Search Report, for PCT/CN2011/075319, dated Sep. 22, 2011.
Supplementary European Search Report for EP 11 83 2062, dated Sep. 30, 2013.

* cited by examiner

CATALYST FOR PREPARING CHLORINE BY OXIDATION OF HYDROGEN CHLORIDE AND PREPARATION THEREOF

CROSS REFERENCE TO RELATED APPLICATIONS

This application is a divisional of and claims the benefit and priority to U.S. patent application Ser. No. 13/880184, filed on Jul. 10, 2013, which is a U.S. National Phase application of PCT International Application Number PCT/CN2011/075319, filed on Jun. 3, 2011, designating the United States of America and published in Chinese, which is an International Application of and claims the benefit of priority to Chinese Patent Application No. 201010567038.9, filed on Nov. 18, 2010. The disclosures of the above-referenced applications are hereby expressly incorporated by reference in their entireties.

FIELD OF THE INVENTION

The present invention relates to a catalyst for preparing chlorine by the oxidation of hydrogen chloride and a method for producing the same.

BACKGROUND OF THE INVENTION

Chlorine is an important basic chemical material which has been widely used in the industries of novel materials such as polyurethanes, silicons, epoxy resins, chlorinated rubbers, chlorinated polymers, chlorinated hydrocarbons and the like; the new energy industries such as manufacture of polycrystalline silicon and the like; the industries of fine chemicals such as disinfectors, detergents, food additives, cosmetic additives and the like; the industries of pesticides/pharmaceuticals such as synthetic glycerin, chlorobenzenes, chloroacetic acid, benzyl chloride, $PCl_3$ and the like; as well as the industries of paper manufacture, textile industries, metallurgy industries and petroleum and chemical industries, etc.

Almost all chlorine is produced by the electrolysis of sodium chloride solution in the industries. This process has two big problems. The first one is the high electricity consumption of up to 2760 kWh per ton chlorine, that makes the electricity consumption of the entire chlor-alkali industry comprises about 5% of the total industrial electricity consumption in China. The second one is the process co-produces chlorine and sodium hydroxide. While when sodium hydroxide requirements do not coincide with the demand for chlorine which increases greatly due to the rapid development of chlorine-consuming industries, oversupply of sodium hydroxide occurs. Thus, it is necessary to find a new source of chlorine for the further development of chlorine-consuming industries.

On the other hand, since chlorine is used as a reaction medium in most chlorine-consuming industries, it is not part of the final products but discharged from reaction systems in a form of hydrogen chloride as a by-product. As the rapid development of chlorine-consuming industries, it is increasingly difficult to find outlets for hydrogen chloride. The resulting by-produced hydrochloric acid has low added value, needs high cost for transport and storage and the sale is difficult. Also, 20-50 times of waste water produced in subsequent applications generates a great deal of pressure on the environment. In the case of co-production of PVC, the domestic capacity of PVC is much excessive, and the export amount, price and utilization of capacity are always unsatisfied. Thus, under the current conditions, the outlet of hydrogen chloride has become a bottleneck restricting further development of the chlorine-consuming industries.

If the by-produced hydrogen chloride could be directly transformed into chlorine, the closed circulation of "chlorine" would be realized, thereby the two bottlenecks of upstream and downstream of the chlorine-consuming industries can be essentially solved. The oxidation of hydrogen chloride by oxygen or air as an oxidant to prepare chlorine is a good route. This reaction is represented by the following stoichiometric formula:

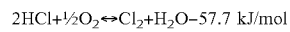

$$2HCl + \tfrac{1}{2}O_2 \leftrightarrow Cl_2 + H_2O - 57.7 \text{ kJ/mol}$$

Currently, there are three different routes to carry out this process, which are the catalytic oxidation method, the cyclic oxidation method and the oxidative electrolysis method. Among them, the representative cyclic oxidation method is developed by Dupont. In this method, sulfuric acid is used as a cyclic oxidative medium and nitric acid is used as a catalyst. Thus, its equipment investment and operational cost are high, and its operation is complex and lack of flexibility. The oxidative electrolysis method can well relief the second problem, which was describe above, in the chlor-alkali industry. However, it still has an electricity consumption level of above 1700 kWh per ton chlorine, and thereby the status of high electricity-consumption in the production of chlorine is not substantially improved. Furthermore, in comparison to ion-membrane electrolysis, the method of oxidative electrolysis of hydrochloric acid requires more complex equipments and has no advantages in economical efficiency and operability. This technique is mastered only by Bayer. However, Bayer introduced the catalytic oxidation technique from Sumitomo (Japan) while is actively finding a market for its oxidative electrolysis technique.

Objectively, the method of catalytic oxidation of hydrogen chloride also requires relatively large equipment investment, and in general, the cost for production of chlorine is estimated to be slightly higher than that of the method of ion membrane electrolysis according to the present technique of Sumitomo (Japan). The greatest advantage of this method is its low electricity consumption of only about 230 kWh per ton chlorine. In addition, it is an environment-friendly chemical process.

In the reported catalysts for hydrogen chloride oxidation, the active ingredients mainly are metal elements such as copper, chromium, gold and ruthenium, etc. Among them, gold and ruthenium-based catalysts are expensive and have poor performance in sulfur-tolerance. Chromium-based catalysts pollute the environment due to their higher toxicity. Thus, the above two kinds of catalysts have such problems of high economic cost or environmental pollution or the like in use. Compared with them, copper-based catalysts have both advantages of lower cost and being environmentally friendly, thus are of great interests.

CN200710121298.1 discloses a catalyst containing cupric chloride, potassium chloride and cerium chloride with alumina as support and treated by phosphoric acid. For this catalyst the yield of chlorine is 80.1% under the conditions that the ratio of hydrogen chloride and oxygen is 1:1, the temperature of fixed bed reactor is 400°C., the reaction pressure is 0.1 MPa and the space velocity of hydrogen chloride is 0.8 $hr^{-1}$. However, this catalyst has a relatively low activity, and the loss of the cupric chloride ingredient under a higher temperature impairs the use life of the catalyst.

CN200910027312.0 discloses a catalyst containing cupric chloride, potassium chloride, manganese nitrate and cerium nitrate supported on silica gel or ReY molecular sieve. With 25 g of this catalyst, the hydrogen chloride conversion is 83.6% with both of hydrogen chloride and oxygen flow rates of 200 ml/min at a reaction temperature of 380°C. However, this catalyst still has the disadvantages of loss of copper ingredients and a relatively low space velocity.

U.S. Pat. No. 4,123,389 discloses a copper-based catalyst with silica gel, alumina or titania as a support, in which the loading amount of active ingredients is between 25% and 70%. The process of preparation of the catalyst needs organic solvents and thus causes great environmental pollution.

Therefore, it is still a technical challenge in the related field to develop a cheap, environment-friendly catalyst with high activity and stability for production of chlorine by catalytic oxidation of hydrogen chloride.

SUMMARY OF THE INVENTION

One object of the invention is to provide a catalyst for production of chlorine by catalytic oxidation of hydrogen chloride which overcomes the disadvantages of the current copper-based catalysts and the catalyst herein has good reaction activity and stability.

Another object of the invention is to provide a method for preparing the above catalyst for production of chlorine by catalytic oxidation of hydrogen chloride.

The catalyst for production of chlorine by catalytic oxidation of hydrogen chloride according to the present invention comprises a support and active ingredients comprising 1-20 wt % of copper, 0.01-5 wt % of boron, 0.1-10 wt % of alkali metal element(s), 0.1-15 wt % of one or more rare earth elements, and 0-10 wt % of one or more elements selected from magnesium, calcium, barium, manganese, iron, nickel, cobalt, zinc, ruthenium and titanium, the weight percent of each ingredient is based on the total weight of the catalyst.

The method for preparing the catalyst according to the present invention comprises the steps of:

(1) preparing a solution by dissolving a copper-containing compound as required and optionally a compound containing a transition metal other than copper in water, then impregnating a support with the solution, and drying the impregnated support;

(2) dissolving a boron-containing compound, a alkali metal-containing compound, a rare earth metal-containing compound and a alkaline earth metal-containing compound as required in water, then impregnating the dried solid obtained in step (1) with the solution, and drying the impregnated solid;

(3) calcining the solid obtained in step (2) at a temperature of 450-650°C. for 1-5 h to obtain the catalyst.

The catalyst according to the present invention can be easily prepared. Meanwhile, comparing with gold and ruthenium-based catalysts, the catalyst according to the invention has a relatively lower price. Due to free of the toxic ingredients such as Cr, etc., the catalyst is relatively environment-friendly and does not cause secondary pollution. Comparing with the available copper-containing catalysts, the catalyst according to the invention has a better stability due to the addition of boron which greatly inhibits the loss of the copper ingredient. In addition, in the two-step impregnation process, the copper-containing compound and the compound containing a transition metal other than copper are firstly loaded on the support by impregnation, and then the other ingredients are loaded on the support by the second impregnation, which makes the resulted catalyst has higher activity, and thereby a higher yield of chlorine can be realized under a higher space velocity of hydrogen chloride. Comparing with the available copper-based catalyst, the catalyst provided by the present invention can improve the yield of chlorine by about 1%-3%, and even by about 4%-5%.

DETAILED DESCRIPTION OF THE INVENTION

The catalyst for oxidation of hydrogen chloride and the preparation method of the catalyst according to the invention are illustrated in detail below, however the present invention is not limited by the following description in any way. In the present invention, the total weight of the catalyst refers to the weight of the final catalyst product.

According to the catalyst for oxidation of hydrogen chloride provided in the present invention, preferably the catalyst comprises the following active ingredients: 4-15 wt %, more preferably 5-12 wt % of copper; 0.1-4 wt %, more preferably 0.15-3 wt % of boron; 2-7 wt %, more preferably 2.5-6 wt % of alkali metal element(s); 1-11 wt %, more preferably 2-9 wt % of one or more rare earth elements; 1-8wt %, more preferably 2-6 wt % of one or more elements selected from magnesium, calcium, barium, manganese, iron, nickel, cobalt, zinc, ruthenium and titanium; as well as 60-90 wt %, preferably 60-85 wt % of a support.

In the catalyst according to the invention, the alkali metal element is any one selected from lithium, sodium, potassium and cesium, preferably is sodium or potassium. The rare earth element is at least one selected from lanthanide elements, preferably is one or more selected from cerium, lanthanum, praseodymium and neodymium.

The support according to the invention is at least one selected from molecular sieve, kaolin, diatomite, silica, alumina, titania and zirconia, preferably is molecular sieve or kaolin, and more preferably is type Y molecular sieve (Y-zeolite).

According to the preparation method of the catalyst for oxidation of hydrogen chloride of the invention, in steps (1) and (2), the impregnation time preferably lasts 8-16 h and then dried at a temperature of 70-110°C. for 12-24 h.

In the process for preparation of the catalyst, the used copper-containing compound is a soluble salt of copper, preferably one or more selected from cupric nitrate, cupric chloride and cupric acetate. In general, when two or more soluble copper salts are used, they can be combined in any proportions. More preferably, the used copper-containing compounds are cupric nitrate and cupric chloride.

The compound containing a transition metal other than copper is selected from soluble salts of manganese, iron, nickel, cobalt, zinc, ruthenium and titanium, preferably one or more selected from corresponding nitrates, chlorides and acetates of manganese, iron, nickel, cobalt, zinc and titanium, and more preferably one or more of corresponding nitrates, chlorides and acetates of manganese, iron, cobalt and zinc.

The boron-containing compound is one or two or three of boric acid, sodium borate and potassium borate. The alkali metal compound is one or more selected from chlorides, nitrates, acetates, carbonates and borates of lithium, sodium, potassium, preferably one or more selected from chloride, nitrate, acetate, carbonate and borate of sodium or potassium. The alkaline earth metal compound is one or more selected from chlorides, nitrates, acetates, carbonates and borates of magnesium, calcium and barium, and preferably one or more selected from chlorides, nitrates, acetates, carbonates and borates of magnesium and calcium. The rare earth metal compound is one or more selected from nitrates and chlorides of cerium, lanthanum, praseodymium and neodymium, preferably one or more selected from the nitrates.

The catalyst of the invention is useful in the reaction for producing chlorine by catalytic oxidation of hydrogen chloride, which may be carried out in a fixed bed reactor or in other reactors suitable for such reactions.

The reaction conditions for producing chlorine by the oxidation of hydrogen chloride are that: the reaction temperature is 320-460°C., preferably 360-400°C.; the reaction pressure is 0.1-0.6 MPa, preferably 0.1-0.35 MPa; the mole ratio between hydrogen chloride and oxygen is 0.5-9:1, preferably 1-4:1; and the mass space velocity of hydrogen chloride is 0.1-2.5 $h^{-1}$, preferably 0.5-2 $h^{-1}$.

The present invention provides the catalyst for producing chlorine by the oxidation of hydrogen chloride, which comprises a support and the metal salts or metal oxides applied thereon. The metal salts or metal oxides are loaded onto the support such that the catalyst comprises: 1-20 wt % of copper, 0.01-5 wt % of boron, 0.1-10 wt % of alkali metal element, 0.1-15 wt % of one or two or more of rare earth elements, ≥0-10 wt % of one or two or more of magnesium, calcium, barium, manganese, iron, nickel, cobalt, zinc, ruthenium or titanium, each based on the total weight of the catalyst.

The catalyst and the preparation method thereof according to the invention will be further described in detail with reference to the following Examples. But the present invention is not limited by these Examples in any way. In the following Examples and Comparative Examples, "%"used refers to "wt %"unless specified otherwise.

The following Examples and Comparative Examples are carried out in a fixed bed reactor. The general reaction procedure is as follows: hydrogen chloride and oxygen are fed into the top of a quartz tube reactor with their pressures respectively controlled by pressure stabilization valves and their flow rates respectively controlled by mass flow controllers, and the gas flows pass the catalyst bed to conduct the reaction after preheated with quartz sands. The reaction product is absorbed by an excess potassium iodide solution, and the amount of resultant chlorine is measured by the iodometric method and the amount of unreacted hydrogen chloride is measured by acid-base titration for calculating the yield of chlorine.

In addition, in the following Examples and Comparative Examples, the aqueous solution containing active ingredients is slight excess in impregnation steps, and the solid is directly dried after impregnation, thus there is no loss of the active ingredients.

EXAMPLE 1

In a 40 ml of aqueous solution that contains 26.3 g $CuCl_2.2H_2O$, 60 g of HY molecular sieve (rare earth HY molecular sieve, manufactured by Mingmeiyoujie Mining Co. Ltd., Mingguang City, the same below) is impregnated for 12 h, then dried at 90°C. for 16 h. The resultant solid is re-dispersed in a 50 ml of aqueous solution that contains 0.92 g $H_3BO_3$, 4.95 g KCl, 8.15 g $Ce(NO_3)_3.6H_2O$ and 4.05 g $Nd(NO_3)_3.6H_2O$ to perform impregnation for 12 h, then dried at 90°C. for 16 h. The dried solid is calcined at 500°C. for 4 h to obtain 90 g of active catalyst. It is tableted to obtain catalyst granules of 30-60 mesh. 6 g of the catalyst of 30-60 mesh is loaded in a fixed bed reactor to conduct a reaction with of the flow rates of hydrogen chloride and oxygen of 100 ml/min respectively, with the reaction temperature at 380°C. and the reaction pressure at 0.18 MPa. After 4 h of reaction, the chlorine yield is 88.6%; and after 100 h of reaction, the chlorine yield is 89.0%. The activity of the catalyst is stable. After 1000 h of reaction, the chlorine yield is 87.8%, that is, the catalyst still keeps quite a high activity.

COMPARATIVE EXAMPLE 1

In a 42 ml of aqueous solution that contains 26.3 g $CuCl_2.2H_2O$, 60 g HY molecular sieve is impregnated for 12 h, then dried at 90°C. for 16 h. The resultant solid is re-dispersed in a 54 ml of aqueous solution that contains 4.95 g KCl, 8.15 g $Ce(NO_3)_3.6H_2O$ and 4.05 g $Nd(NO_3)_3.6H_2O$ to perform impregnation for 12 h, then dried at 90°C. for 16 h. After being calcined at 500°C. for 4 h, 90 g of active catalyst is obtained. It is tableted to obtain catalyst granules of 30-60 mesh.

With the same reaction conditions as in Example 1, the chlorine yield is 88.2% after 4 h of reaction, and is 86.4% after 100 h of reaction. Obviously, the catalyst has a relatively poor stability.

It can be concluded from the comparison of Example 1 and Comparative Example 1 that the addition of boron element improves the stability of the catalyst.

EXAMPLE 2

In a 41 ml of aqueous solution that contains 26.3 g $CuCl_2.2H_2O$, 60 g kaolin is impregnated for 12 h, then dried at 90°C. for 16 h. The resultant solid is re-dispersed in a 49 ml of aqueous solution that contains 1.15 g $H_3BO_3$, 4.95 g KCl, 8.15 g $Ce(NO_3)_3.6H_2O$ and 4.05 g $La(NO_3)_3.6H_2O$ to perform impregnation for 12 h, then dried at 90°C. for 16 h. After being calcined at 500°C. for 4 h, 90 g of active catalyst is obtained. It is tableted to obtain catalyst granules of 30-60 mesh. With the same reaction conditions as in Example 1, the chlorine yield is 86.1% after 4 h of reaction and is 85.8% after 100 h of reaction. The activity of the catalyst substantially remains unchanged. After 1000 h of reaction, the catalyst still keeps its activity with the chlorine yield of 85.4%.

EXAMPLE 3

In a 45 ml of aqueous solution that contains 17.8 g $CuCl_2.2H_2O$ and 11.5 g $Co(NO_3)_2.6H_2O$, 60 g HY molecular sieve is impregnated for 12 h, then dried at 90°C. for 16 h. The resultant solid is re-dispersed in a 50 ml of aqueous solution that contains 0.46 g $H_3BO_3$, 4.95 g KCl, 8.15 g $Ce(NO_3)_3.6H_2O$ and 4.05 g $Pr(NO_3)_3.6H_2O$ to perform impregnation for 12 h, then dried at 90°C. for 16 h. After being calcined at 500°C. for 4 h, 86 g of active catalyst is obtained. It is tableted to obtain catalyst granules of 30-60 mesh. With the same reaction conditions as in Example 1, the chlorine yield is 86.4% after 4 h of reaction and is 86.8% after 100 h of reaction. The catalyst keeps a stable activity. The chlorine yield is 86.0% after 1000 h of reaction.

EXAMPLE 4

In a 40 ml of aqueous solution that contains 26.3 g $CuCl_2.2H_2O$, 60 g HY molecular sieve is impregnated for 12 h, then dried at 90°C. for 16 h. The resultant solid is re-dispersed in a 54 ml of aqueous solution that contains 0.92 g $H_3BO_3$, 3.05 g KCl, 1.35 g $Mg(NO_3)_2.2H_2O$, 8.15 g $Ce(NO_3)_3.6H_2O$ and 4.05 g $La(NO_3)_3.6H_2O$ to perform impregnation for 12 h, then dried at 90°C. for 16 h. After being calcined at 500°C. for 4 h, 89 g of active catalyst is obtained. It is tableted to obtain catalyst granules of 30-60 mesh.

In a fixed bed reactor, 6 g of the catalyst prepared in Example 4 is loaded to conduct a reaction with the flow rates of hydrogen chloride and oxygen of 150 ml/min respectively, with the reaction temperature at 383°C. and the reaction pressure at 0.18 MPa. After 4 h of reaction, the chlorine yield is 85.7%, and after 100 h of reaction, is 85.2%. The activity of the catalyst substantially keeps activity. After 1000 h of reaction, the chlorine yield is 85.1%.

COMPARATIVE EXAMPLE 2

In a 65 ml of aqueous solution that contains 26.3 g $CuCl_2.2H_2O$, 3.05 g KCl, 1.35 g $Mg(NO_3)_2$ $2H_2O$, 8.15 g $Ce(NO_3)_3.6H_2O$ and 4.05 g $La(NO_3)_3.6H_2O$, 60 g HY molecular sieve is impregnated for 12 h, then dried at 90°C. for 16 h. After being calcined at 550°C. for 4 h, 90 g of active catalyst is obtained. It is tableted to obtain catalyst granules of 30-60 mesh. With the same hydrogen chloride oxidation reaction conditions as in Example 4, the chlorine yield is 82.9% after 4 h of reaction and is 82.0% after 100 h of reaction. The chlorine yield is 80.2% after 1000 h of reaction It can be concluded from the comparison between Example 4 and Comparative Example 2 that the catalyst obtained through the two-step impregnation process has a significantly higher activity than that of the catalyst prepared by the one-step impregnation process has. Use of the inventive catalyst in a reaction for production of chlorine by oxidation of hydrogen chloride can increase the chlorine yield by about 3 percent.

The invention claimed is:

1. A method for producing chlorine by oxidation of hydrogen chloride comprising:
   contacting a catalyst comprising a support and metal salts or metal oxides applied thereon with hydrogen chloride under oxidative conditions thereby producing chlorine, wherein the metal salts or metal oxides of the catalyst are loaded onto the support such that the catalyst consists of the following active ingredients:
   5-20 wt % of copper, 0.01-5 wt % of boron, 0.1-10 wt % of alkali metal element(s), 0.1-15 wt % of one or more rare earth elements, and 0-10 wt % of one or more elements selected from the group consisting of: magnesium, calcium, barium, manganese, iron, nickel, cobalt, zinc, and titanium, based on the total weight of the catalyst, and wherein the metal salts or metal oxides of the copper are prepared from a copper-containing compound, wherein the copper containing compound is one or more soluble salts of copper selected from the group consisting of cupric nitrate, cupric chloride, and cupric acetate;
   and wherein the catalyst is made by:
   (a) preparing a solution by dissolving the copper-containing compound and optionally a compound containing a transition metal selected from the group consisting of Mn, Fe, Ni, Co, Zn and Ti in water, then impregnating a support with the solution, and drying the impregnated support;
   (b) dissolving a boron-containing compound, an alkali metal-containing compound, an alkaline earth metal-containing compound and a rare earth metal-containing compound in water, then impregnating the dried solid obtained in step (a) therein, and drying the impregnated solid; and
   (c) calcining the solid obtained in step (b) at a temperature of 450-650°C. for 1-5 hours so as to obtain the catalyst.

2. The method according to claim 1, wherein the active ingredients consist of:
   5-15 wt % of copper, 0.1-4 wt % of boron, 2-7 wt % of alkali metal element(s), 1-11 wt % of one or more rare earth elements, and 1-8 wt % of one or more elements selected from the group consisting of:
   magnesium, calcium, barium, manganese, iron, nickel, cobalt, zinc, and titanium.

3. The method according to claim 2, wherein the active ingredients consist of:
   5-12 wt % of copper, 0.15-3 wt % of boron, 2.5-6 wt % of alkali metal element(s), 2-9 wt % of one or more rare earth elements, and 2-6 wt % of one or more elements selected from the group consisting of:
   magnesium, calcium, barium, manganese, iron, nickel, cobalt, zinc, and titanium.

4. The method according to claim 1, wherein the support comprises one or more of:
   a molecular sieve, kaolin, diatomite, silica, alumina, titania or zirconia, and the support comprises 60-90 wt % of the total weight of the catalyst.

5. The method according to claim 4, wherein the alkali metal element is lithium, sodium, potassium or cesium.

6. The method according to claim 5, wherein the rare earth element comprises one or more lanthanide elements.

7. The method according to claim 1, wherein the compound containing a transition metal other than copper is a soluble salt of manganese, iron, nickel, cobalt, zinc, or titanium.

8. The method according to claim 1, wherein the boron-containing compound is a soluble boron compound.

9. The method according to claim 1, wherein the alkali metal-containing compound is a soluble salt of lithium, sodium or potassium.

10. The method according to claim 1, wherein the alkaline earth metal-containing compound is a soluble salt of magnesium, calcium or barium.

11. The method according to claim 1, wherein the rare earth metal-containing compound is a soluble salt of a rare earth element.

12. The method according to claim 1, wherein
   the boron-containing compound is one or more of:
      boric acid, sodium borate or potassium borate;
   the compound containing the transition metal other than copper is one or more of:
      nitrates, chlorides or acetates of manganese, iron, nickel, cobalt or zinc;
   the alkali metal-containing compound is one or more of:
      a chloride, a nitrate, an acetate, a carbonate or a borate of sodium or potassium;
   the alkaline earth metal-containing compound is one or more of:
      chlorides, nitrates, acetates, carbonates or borates of magnesium or calcium;
   and the rare earth metal-containing compound is one or more of:
      nitrates of cerium, lanthanum, praseodymium or neodymium.

* * * * *

UNITED STATES PATENT AND TRADEMARK OFFICE
CERTIFICATE OF CORRECTION

PATENT NO. : 10,576,465 B2
APPLICATION NO. : 15/621282
DATED : March 3, 2020
INVENTOR(S) : Guangquan Yi et al.

It is certified that error appears in the above-identified patent and that said Letters Patent is hereby corrected as shown below:

On the Title Page

Column 2, Item (56), Line 1, under Other Publications, delete "pulication" and insert --publication--.

In the Specification

In Column 2, Line 6, delete ""would" and insert --" would--.

In the Claims

In Column 7, Claim 1, Line 54, delete "copper containing" and insert --copper- containing--.

In Column 7, Claim 1, Line 61, after "metal" insert --other than copper--.

Signed and Sealed this
Thirtieth Day of November, 2021

Drew Hirshfeld
*Performing the Functions and Duties of the*
*Under Secretary of Commerce for Intellectual Property and*
*Director of the United States Patent and Trademark Office*